United States Patent [19]

Yan

[11] Patent Number: 5,438,374
[45] Date of Patent: Aug. 1, 1995

[54] SYSTEM AND METHOD FOR FILTERING VIDEO SIGNALS

[75] Inventor: Li Yan, Holmdel, N.J.
[73] Assignee: AT&T Corp., Murray Hill, N.J.
[21] Appl. No.: 165,271
[22] Filed: Dec. 10, 1993
[51] Int. Cl.$^6$ ............................................. H04N 5/213
[52] U.S. Cl. ..................................... 348/620; 348/416
[58] Field of Search ............... 348/619, 620, 416, 413; H04N 5/213

[56] References Cited

U.S. PATENT DOCUMENTS

| | | | |
|---|---|---|---|
| 4,646,138 | 2/1987 | Willis | 348/620 |
| 4,780,761 | 10/1988 | Daly et al. | |
| 4,969,040 | 11/1990 | Gharavi | |
| 5,091,782 | 2/1992 | Krause et al. | |
| 5,113,256 | 5/1992 | Citta et al. | |
| 5,136,377 | 8/1992 | Johnston et al. | |
| 5,151,784 | 9/1992 | Lavagetto et al. | 359/136 |
| 5,208,673 | 5/1993 | Boyce | 348/620 |
| 5,212,547 | 5/1993 | Otsuki | 348/416 |
| 5,301,019 | 4/1994 | Citta | 348/416 |

FOREIGN PATENT DOCUMENTS 4221236 1/1994 Germany ...................... H04N 5/213

OTHER PUBLICATIONS

Haskell, et al., Interframe Coding of 525-Line, Monochrome Television at 1.5 Mbits/s, *IEEE Transactions on Communications*, vol. Com-25, No. 11, Nov. 1977, pp. 1339–1348.
Boyce, Jill M., Noise Reduction of Image Sequences Using Adaptive Motion Compensated Frame Averaging, SPIE Proceedings, vol. 3, pp. 461–464 (1992).
Consultative Committee International Telegraph and Telephone, Draft Revised Recommendation H.261—Video Codec for Audiovisual Services at p×64 kbit/s, Submitted to the Xth CCITT Plenary Assembly, *Study Group SV-Report R 95*, May 1992.
DuBois, et al., Noise Reduction in Image Sequences Using Motion-Compensated Temporal Filtering, *IEEE Transactions on Communications*, vol. COM-32, No. 7, Jul. 1984, pp. 826–831.
Draft Committee, International Organisation for Standardization Organisation Internationale de Normalisation, ISO/IEC JTC1/SC29, Coding of Moving Pictures and Associated Audio, Recommendation H.262, Nov. 3, 1993.
Draft International Standard ISO/IEC DIS 11172, Information Technology—Coding of Moving Pictures and Associated Audio for Digital Storage Media up to About 1,5 Mbit/s, 1992.
S. Lim, *Two Dimensional Signal Processing and Image Processing*, pp. 468–476 (1990).

Primary Examiner—James J. Groody
Assistant Examiner—Jeffrey S. Murrell

[57] ABSTRACT

Motion video is represented by digital signals. The digital signals can be compressed by coding to reduce bitspace. Noise in the signal, however, reduces the efficiency of coding. The present invention is a system and method for reducing noise in video signals by filtering. The signal for the current frame is weightedly averaged with signals for a future and prior frame. The future and prior frames are given less weight as they differ more from the current frame. When motion compensation information is available, the motion compensated future and prior frames can be used for averaging, further improving filtering.

29 Claims, 5 Drawing Sheets

SYSTEM AND METHOD FOR FILTERING VIDEO SIGNALS

A portion of the disclosure of this patent document is subject to copyright protection. The copyright owner has no objection to the facsimile reproduction by anyone of the patent disclosure, as it appears in the Patent and Trademark Office patent files or records, but otherwise reserves all copyright and other rights whatsoever.

FIELD OF THE INVENTION

The systems and methods of the present invention relate to the field of digital motion video signal processing and, in particular, to a method and a system useful for processing noise-contaminated digital motion video signals prior to or after video compression operations.

BACKGROUND OF THE INVENTION

Motion video can be represented by a digital signal in which a series of bits of information represent each video frame. As more bits of information are required to represent each frame, the cost and complexity of the hardware necessary to process the signals as well as the delay in processing the signal are increased.

Image compression is a process which allows the digital signals representing images, such as frames of a motion video, to be transmitted in a coded form over a communications channel or to be stored on a medium, such as a CD ROM, using fewer bits of data than would be required for an uncoded image. Image compression is based on the removal of redundant data. Because the storage and transmission of digital video signals is central to many applications, and because an uncompressed representation of a video signal requires a large amount of bitspace, either in storage or transmission, the use of digital video compression techniques is vital to this advancing art.

Noise in video signals degrades both the image quality and the performance of subsequent coding operations by creating random fluctuations in the bit information thereby reducing the redundancy, and making coding of the later pictures less efficient since there are more "changes" from frame to frame. Consequently, eliminating noise improves the efficiency of coding as well as the final picture quality.

The present invention relates to noise reduction, particularly, temporal noise reduction. Temporal noise can be reduced by simple frame averaging, as described by S. Lim, Two Dimensional Signal Processing and Image Processing pp. 468–476 (Prentice Hall 1990), incorporated herein by reference. When the images in the motion video are static, this is an effective technique. When the image is moving, however, simple frame averaging blurs moving objects, which reduces the image resolution.

In another method, explained in B. G. Haskell, P. L. Gordon, R. L. Schmidt and J. V. Scattaglia, IEEE Trans. on Communications, Vo. Com-25, No. 11 1977, incorporated herein by reference, a motion detector is used to distinguish the stationary areas in each frame of a motion video sequence from the moving area in that frame. Noise reduction techniques (or filtering) are applied only in the stationary area. This method is easily implemented but does not reduce noise in the moving area.

Other methods of noise reduction use motion information to permit noise reduction in the moving area. See E. Dubois and S. Sabri, Noise Reduction in Image Sequencing Using Motion-Compensated Temporal Filtering, IEEE Trans. on Communications, Vol. Com-32, No. 7, 1988 (using two frame temporal support and one directional motion compensation); J. M. Boyce, Noise Reduction of Image Sequences Using Adaptive Motion Compensated Frame Averaging, SPIE Proceedings, Vol. 3, pp. 461–464, 1992 (using small block size), both incorporated herein by reference. The first method is limited in that it uses only two frames for filtering. The second method requires additional motion estimation and added frame storage, thus increasing the cost and complexity of the hardware required for filtering.

SUMMARY OF THE INVENTION

It is thus an object of the present invention to provide a system and method for reducing noise in a motion video sequence without requiring an additional motion estimator.

It is also an object of the present invention to provide a system and method for reducing noise in frames without requiring a substantial increase in digital memory.

It is also an object of the present invention to provide a system and method for reducing noise throughout an entire frame.

It is also an object of the present invention to provide a system and method for reducing noise in a frame based on motion information calculated for later coding operations.

The present invention relates to a method and system of creating a noise-reduced frame based upon the signals from a current frame, a prior frame or a prior filtered frame and a future frame or a future filtered frame. A frame difference between the current frame and the prior frame is calculated. A weighting factor is calculated based on the frame difference. A weighted average of the current frame and the prior frame is calculated based, at least in part, on the weighting factor to create an intermediate frame. A second frame difference between the intermediate frame and the future frame is calculated. A second weighting factor is calculated based on the second frame difference. A filtered frame is created as the weighted average of the future frame and the intermediate frame based, at least in part, on the second weighting factor.

DETAILED DESCRIPTION

Figure 1:
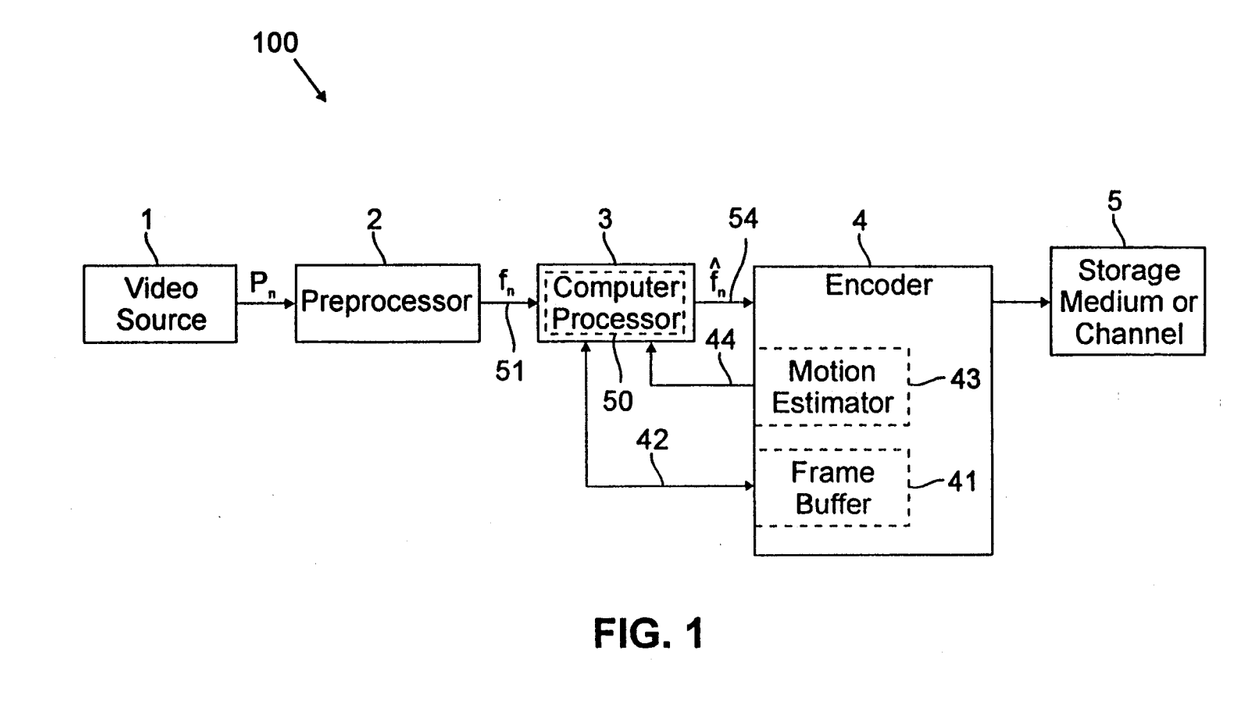
FIG. 1 is a block diagram of a video signal encoding system having a prefilter operating in accord with the present invention.

FIG. 1 is a block diagram of a motion video encoding system 100. An analog video signal, $P_n$, is generated at a video source 1, such as a video camera or a laser disc player, for a series of n pictures. The analog signal $P_n$ proceeds from the source 1 to a preprocessor 2 which includes an analog to digital converter, where it is transformed into a digital signal $f_n$, representing a series of n frames. If necessary, the digital signal can be further converted by the preprocessor 2 to a digital signal with appropriate resolution as may be required depending on whether the signal will be sent over a communications channel or will be stored on a digital medium, such as a CD-ROM.

A prefilter 3, including a computer processor 50, is connected to the preprocessor 2 and operates in accord with the present invention to filter the video signal to create a noise-reduced signal $f_n$ for each frame. As discussed more fully below, the noise-reduced signal $f_n$ is calculated by the computer processor 50 as a non-linear average of the current frame and a prior frame and a future frame. The noise-reduced signal $f_n$ is connected to an encoder 4, such as an H.261 or MPEG encoder, which translates the video signal for the noise-reduced signal into a compressed video bitstream. The digital signals $f_n$ for numerous frames are stored in a frame buffer 41 of the encoder 4. Preferably, the frame buffer 41 can store the signals for at least five frames. Motion vectors and predictions, discussed more fully below, are calculated by a motion estimator 43 which is also part of the encoder 4. These motion vectors and predictions are used for encoding in a manner well known in the art. As shown in FIG. 1, the encoder 4 is a distinct piece of equipment. However, it is understood that, typically, the encoder 4 and a decoder 6 (see FIG. 5) are together, collectively called a codec. The compressed video signal generated by the encoder 4 is then stored in a storage medium 5, such as on a CD-ROM, or transmitted through a channel, such as a ISDN link.

Presently, it is preferred that the filtering of the present invention be carried out by a programmed computer processor 50 suitable for performing the functions of the prefilter 3. Preprocessor input line 51, carries signals from the preprocessor 2 to the processor 50. Frame buffer input line 42 carries signals from the frame buffer 41 to the processor 50. Motion estimator input line 44 carries signals for motion information from the motion estimator 43 to the processor 50. Computer output line 54 carries signals from the computer processor 50 to the encoder 4.

The encoder 4 (as well as the decoder 6 of FIG. 5) creates the compressed signal using algorithms based on well-known compression techniques, e.g., the CCITT (Consultative Committee on International Telegraphy and Telephony) Recommendation H.261, Draft Revised Recommendation H.261-Video Codec for Audiovisual Services at p×64 kbit/s, Study Group XV-Report R95 (May 1992) incorporated herein by reference, and the ISO/IEC MPEG standard. The H.261 by CCITT is a coding standard for audio-visual services at p×64 kbit/s transmission rate. It has applications in videophone, videoconference and other audio-visual transmission over ISDN networks. The MPEG algorithms, which include MPEG1 and MPEG2, have been developed by the Moving Picture Experts Group (MPEG), part of a joint technical committee of the International Standards Organization (ISO) and the International Electrotechnical Commission (IEC). The MPEG1 standards, as set forth in ESO-IEC JTC1SC2/WG11MPEG CD-11172 Committee Draft, 1991, are included as a part of MPEG2, as set forth in ISO-IEC JTC1/SC29/WG11/602 Committee Draft, 1993, incorporated herein by reference. The MPEG standards are intended for high quality digital video storage and high quality digital video transmission over a broadband network.

The present invention is presently intended for use with either an H.261 codec or an MPEG codec. The H.261 and the MPEG video compression algorithms both rely on block-based motion compensation for the compression of redundancy. The block-based motion compensation of temporal compression requires the generation of a motion vector and a prediction. As described below, the prediction will be used for filtering.

The major difference between the H.261 and MPEG standards is the types of pictures used for reducing the temporal redundancy. H.261 uses two picture types, I and P, which correspond to two different compression modes. For I-pictures, coded in intra-coding mode, all the information required to reproduce that frame is contained within the bitstream for that frame. For P-pictures, coded in an intercoding mode, information regarding a prior reference frame and motion compensation information are required to reproduce that frame. In MPEG coding, three picture types are used: I, P, and B. I- and P-pictures employ the same compression methods used in H.261. B-pictures, coded in another inter-coding mode, require a prior and a future reference frame as well as motion compensation information from both reference frames to the current frame to reproduce the current frame.

The present invention is intended for H.261 and MPEG codecs. It is to be noted, however, that the invention can also be applied to codecs using other video coding algorithms which share pertinent features of the H.261 or MPEG algorithm, as one skilled in the art would understand.

A macroblock is a 16×16 matrix of picture elements, or "pels" or "pixels". Each frame of motion video is divided into a variable number of macroblocks depending on the number of pixels per frame. A macroblock is comprised of a 16×16 matrix of luminance pels, y, and two 8×8 matrixes of chrominance pels, $C_b$ and $C_r$. When the video signal is in digital form, each component of a pel is represented by numerical values, i.e., the "pel value". When frames are "compared" it is the value of the corresponding pel components that are compared.

Figure 2A:
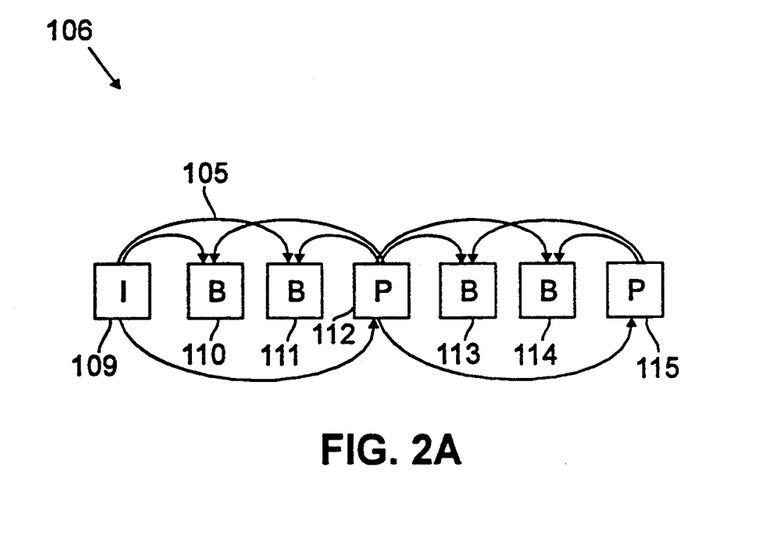
FIG. 2a is a group of pictures for MPEG coding in display order.
Figure 2B:
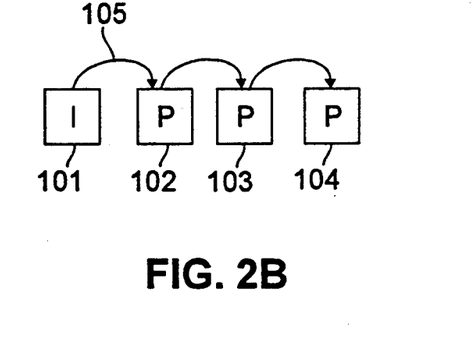
FIG. 2b is a group of pictures for H.261 coding in display order.

FIG. 2b is a schematic representation of a series of four frames 101–104 of an H.261 video, shown in display order. FIG. 2a shows a schematic representation of a series of seven frames 109–115 of an MPEG video, shown in display order. Arrows 105 indicate the reference frames. Each P-picture is coded using the previous I-picture or P-picture. For example, frame 102 is coded with respect to frame 101, an I-picture. Each B-picture is coded by the I- or P-pictures immediately before and after it. For example, frame 110 is coded with respect to frame 109, a prior reference frame, and frame 112, a future reference frame. Frames or pictures are generally collected into small units known as a group of pictures 106, or GOP's, such as the ones shown in FIG. 2. The advantage of grouping frames in this way is that, should some information in the group be contaminated, only that group will be affected. The next group will be isolated from the contamination.

Of the three picture types, I-pictures most closely mirror the original frame. Further, I-pictures provide a reference point for random access. Since coding of I-pictures exploits only spacial redundancy (i.e., within the frame), they take up the most space within the bitstream. It is therefore advantageous to have as many B- and P-pictures as possible to reduce the amount of information transmitted. Video accuracy, however, decreases as more P- and B-pictures are introduced, reducing the quality of the final video. Consequently, a balance must be struck depending on the type of pictures and the demands of the particular system. One typical pattern for an MPEG encoder is: IBBPBBP as shown in FIG. 2a.

P-pictures use motion compensation to exploit temporal redundancy in the video. P-pictures are coded with reference to a prior frame (either an I- or a P-picture) and can be used as reference for future intercoded pictures. For example, to encode a P-picture, the frame is partitioned into macroblocks or "MBs". Each MB is compared to $16 \times 16$ regions of pels in the same general spatial location in a reference frame. For P-pictures, a "forward prediction" of the motion of the $16 \times 16$ region from the reference frame to the current frame is made. Motion between the frames usually implies that the pels in the previous picture will be in a different frame location from the pels in the current frame macroblock. The region in the reference picture that best matches the MB is used as the "prediction". The difference between the spatial location of the MB and that of its prediction is referred to as a "motion vector". The encoder 4 generates the motion vector and the prediction.

For B-pictures, there are two reference frames. The current frame is divided into macroblocks and forward and backward motion vectors as well as forward and backward predictions are calculated by the encoder 4.

Figure 3:
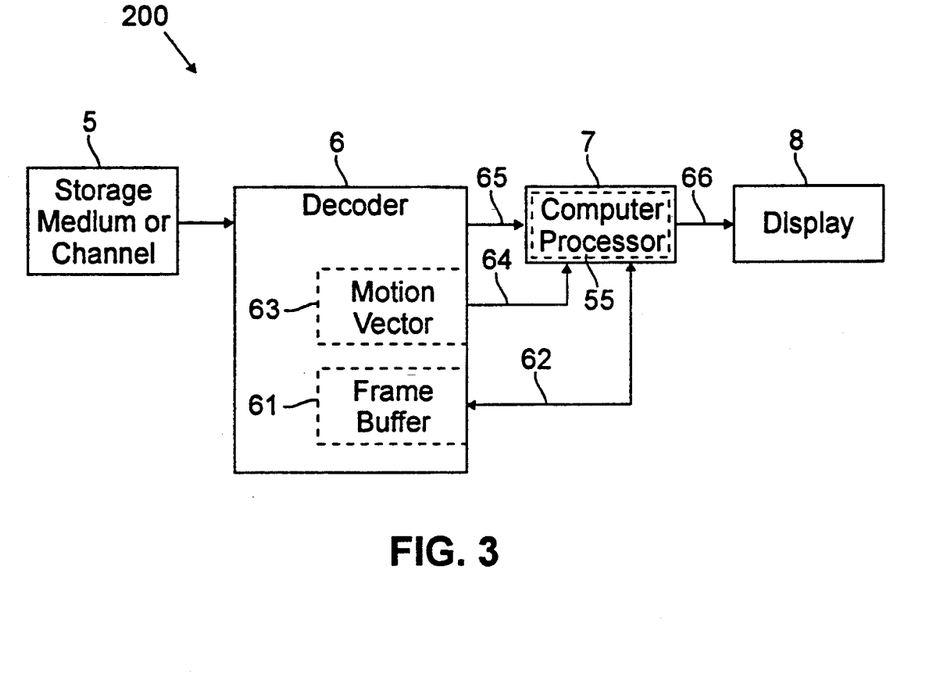
FIG. 3 is a block diagram of a video signal decoding system having a postfilter operating in accord with the present invention.

FIG. 3 is a block diagram of a decoding system 200 including a decoder 6, such as an H.261 or MPEG decoder, and a postfilter 7, including a computer processor 55, operating in accord with the present invention. The coded video signal in bitstream form is received from either a storage media or a communication channel 5. The bitstream is sent to the decoder 6. If the current frame is an I-picture, then the decoded signal is sent directly to the postfilter 7 and stored in a frame buffer 61. If the current frame is a P-picture, the motion vector and related information are decoded by decoder 6. The P-picture is then reconstructed based on the motion vector and the reconstructed reference frame by the decoder 6. If the current frame is a B-picture, both forward and backward motion vectors, which have been decoded from the bitstream, as well as the reconstructed reference frames, are used to produce the current frame. The reconstructed frame is sent to the postfilter 7 and stored in the frame buffer 61.

At the postfilter 7, the reconstructed frames are filtered by nonlinear averaging with prior and future reconstructed frames. The method of filtering, whether post- or prefiltering varies depending on the picture type (i.e., I-, P-, or B-pictures). The motion information used in the prefiltering is the same as the information already calculated by the encoder 4 for encoding the signals. The motion information used in postfiltering is the same as the information extracted from the bitstream by the decoder 6 and used when decoding the signals. Consequently, no separate motion estimation needs to be done. The filters of the present invention share the information stored in the frame buffer of the codec and the motion information calculated by the codec. Thus, little additional equipment is necessary to add this filter to an existing system.

Presently, it is preferred that the filtering of the present invention be carried out by a programmed computer processor 55 suitable for performing the functions of the postfilter 7. Decoder input line 65 carries signals from the decoder 6 to the processor 55. Motion vector input line 64 carries signals for motion information from the decoder 6 to the processor 55. Frame buffer input line 62 carries signals from the frame buffer 61 to computer processor 55. Display output line 66 carries signals from the computer processor 55 to the display 8.

The presently preferred code for filtering the frames is appended hereto as Appendix I. As shown in the figures, two programmed computer processors 50 and 55 are used for filtering: one before and one after coding. Of course, a single programmed computer processor could be used to filter the frames before and after coding and still practice the invention.

The method and system of filtering of the present invention will now be discussed in detail. The method and system will be discussed with respect to encoding. However, it will be appreciated that this method is applicable to decoding as well.

Figure 4:
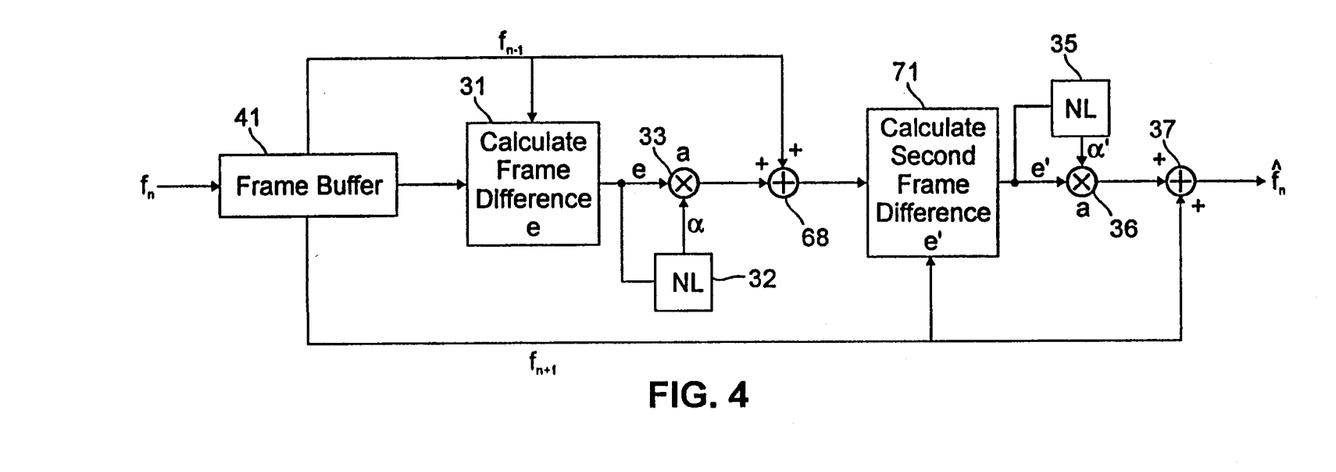
FIG. 4 is a block diagram of the filtering method of the present invention for I-pictures.

FIG. 4 is a block diagram of the temporal filter of the present invention for I-pictures. The frame buffer 41 (or frame buffer 61 if decoding) stores the signal for the current frame $f_n$, the adjacent prior frame $f_{n-1}$, and the adjacent future frame $f_{n+1}$. A frame difference e between the current frame and the adjacent prior frame is calculated at block 31. The frame difference e is a measure of the difference in pel values for spatially co-located pels in the different frames. Let $x_n(i,j)$ be a pel in the current frame $f_n$ at spatial location (i,j) and $x_{n-1}(i,j)$ represents the pel at the corresponding spatial location in frame $f_{n-1}$. Then the frame difference e at the location (i,j) between the frame $f_n$ and $f_{n-1}$ is computed as $$e(i,j) = x_n(i,j) - x_{n-1}(i,j). \qquad (1)$$

The frame difference $e(i,j)$ between the current frame $f_n$ and the adjacent prior frame $f_{n-1}$ is sent to a nonlinear mapper 32 where the coefficient $\alpha$ is determined based on the frame difference $e(i,j)$. The frame $f_n$ is segmented into stationary areas, transition areas, and moving areas with respect to the previous frame. If $e(i,j)$ is less than a lower threshold, Ta, the pels $x_n(i,j)$ and $x_{n-1}(i,j)$ are in the stationary areas; if e is between the lower threshold Ta and an upper threshold Tb, the pels $x_n(i,j)$ and $x_{n-1}(i,j)$ are in transition areas; if e is larger than Tb, the pels $x_n(i,j)$ and $x_{n-1}(i,j)$ are in moving areas. Acceptable thresholds, Ta and Tb, can be 9 and 50, respectively, for the luminance component y, 4 and 10 for the chrominance component $C_b$, and 4 and 10 for the chrominance component, $C_r$.

Figure 5:
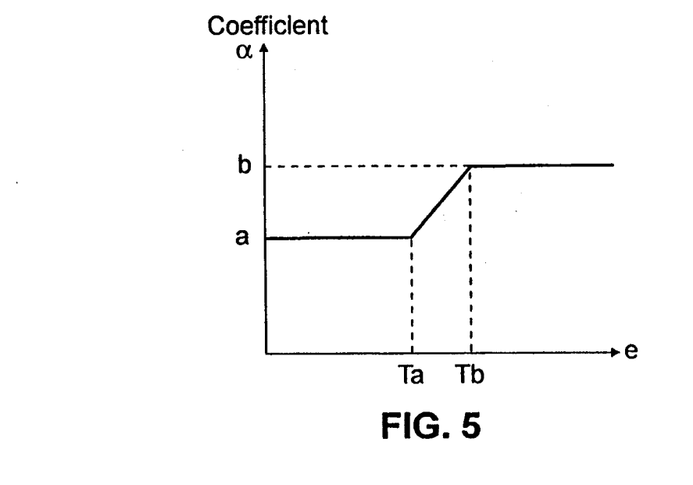
FIG. 5 is a chart of the weighting factor as a function of frame difference.

A weighted average $f'_n$ of the current frame $f_n$ and the prior adjacent frame $f_{n-1}$ is calculated in accord with eq. 2:

$$f'_n = \alpha f_n + (1-\alpha) f_{n-1} \qquad (2)$$

where e is a weighting factor selected based on the frame difference e in accord with the chart of FIG. 5.

The frames are averaged on a pixel-to-pixel basis such that eq. 2 becomes:

$$x'_n(i,j) = \alpha x_n(i,j) + (1-\alpha) x_{n-1}(i,j) \quad (3)$$

where $x'_n$ is the weighted average pixel, $x_n$ is the pixel in the current frame $f_n$, and $x_{n-1}$ is the spatially co-located pixel in the prior adjacent frame, $f_{n-1}$.

Expanding and rearranging:

$$x'_n(i,j) = \alpha x_n(i,j) + x_{n-1}(i,j) - \alpha x_{n-1} \quad (4)$$

$$x'_n(i,j) = x_{n-1}(i,j) + \alpha x_n(i,j) - \alpha x_{n-1}(i,j) \quad (5)$$

$$x'_n(i,j) = x_{n-1}(i,j) + \alpha(x_n(i,j) - x_{n-1}(i,j)) \quad (6)$$

However, $(x_n - x_{n-1})$ is simply the frame difference e. Consequently, $$x'_n(i,j) = x_{n-1}(i,j) + \alpha e \quad (7)$$

The weighted average pixel $x'_n$ is simply the prior adjacent pixel $x_{n-1}$ added to the product of the weighting factor e and the frame difference e. The various weighted average pixels $x'_n$ are combined to form the weighted average frame $f'_n$.

FIG. 5 is a chart of the weighting factor $\alpha$ plotted against the frame difference e. When the frame difference e between pixels is below a lower threshold Ta, $\alpha$ is set equal to a lower constant a. Preferably a is equal to 0.5, which would give both pixels equal weight in the weighted average when the pixels are very similar. When the frame difference is above an upper threshold $t_b$, $\alpha$ is set equal to an upper constant b. Preferably b is set equal to 1, which would give the prior frame no weight in the weighted average when the pixels are very different. When the frame difference is between the thresholds, $\alpha$ is defined as follows:

$$\alpha = \frac{b-a}{Tb - Ta} * (e - Ta) + a. \quad (8)$$

As a result, $\alpha$ increases with the frame difference. Consequently, the weight given the prior frame decreases as the frame difference increases.

Referring to FIG. 4, the weighting factors $\alpha(i,j)$ for each pixel in an i-by-j matrix of pixels are simply multiplied by the frame difference e for each pixel at block 33 and then added to the corresponding pixels of the prior adjacent frame $f_{n-1}$ to obtain the weighted averaged frame $f'_n$. The averaged frame or intermediate frame $f'_n$ is the collection of filtered pels $x'_n$.

A second frame difference e' between the filtered frame $f'_n$ and the future frame $f_{n+1}$ is computed at block 71 as $$e'(i,j) = x'_n(i,j) - x_{n+1}(i,j). \quad (9)$$

The second frame difference e' is then used by non-linear mapper 35 to obtain a second weighting factor $\alpha'$ in the same manner as $\alpha$ was obtained.

A filtered frame $\hat{f}_n$ is calculated as a weighted average of the intermediate frame $f'_n$ and the future adjacent frame $f_{n+1}$ in accord with eq. 10:

$$\hat{f}_n = \alpha' f'_n + (1-\alpha') f_{n+1} \quad (10)$$

Resolving for the pel values $\hat{x}_n$ of the filtered frame $\hat{f}_n$:

$$\hat{x}_n(i,j) = x_{n+1}(i,j) + \acute{a} \acute{e} \quad (11)$$

The filtered pels $\hat{x}_n$ are thus obtained by multiplying the second weighting factor $\alpha'(i,j)$ for each pixel in an i-by-j matrix of pixels by the second frame difference e' for each pixel at block 36 and adding the corresponding pixel values of the adjacent future frame at block 37.

Figure 6:
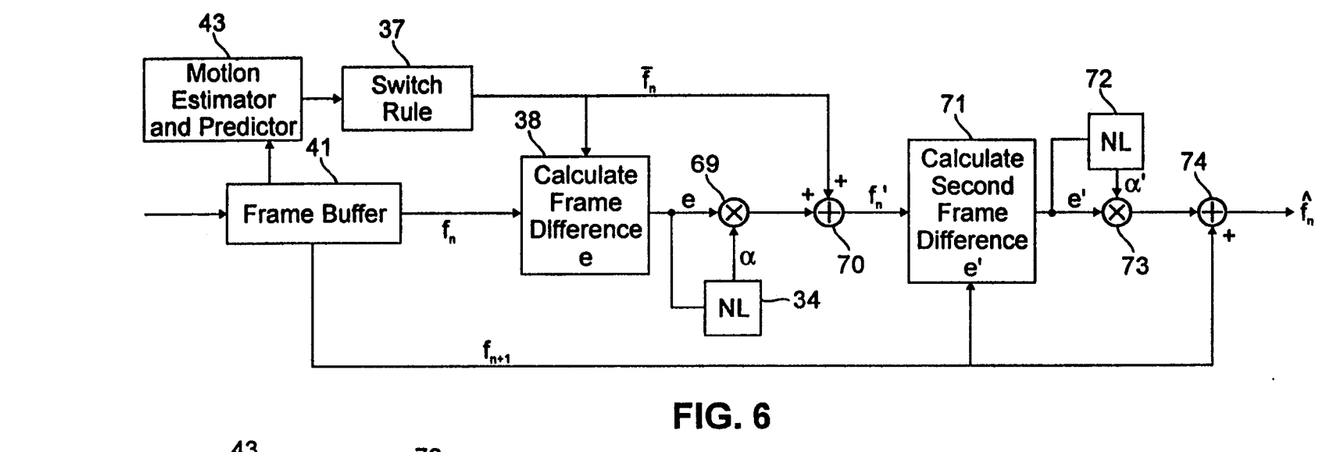
FIG. 6 is a block diagram of the filtering method of the present invention for P-pictures.

FIG. 6 is a block diagram of the temporal filter for P-pictures. The frame buffer 41 (or frame buffer 61 if decoding) stores the signals for the current frame $f_n$, the reference frame, which can be previously filtered I or and the adjacent future frame $f_{n+1}$. Since motion information is available for P-pictures, it will be used to improve filtering. The signals for the current frame and the reference frame $f_n$ are sent to the motion estimator and predictor 43 (or decoder 6 if decoding). At the motion estimator and predictor 43, the current frame is divided into macroblocks. Motion vectors and predictions are generated based on the reference frame.

Each macroblock of the current frame $f_n$ is compared to the corresponding macroblock in the reference frame and to the corresponding macroblock in the motion compensated reference frame. The macroblock from either the reference frame or the motion compensated reference frame most similar the macroblock in the current frame is used for filtering. A best frame $\bar{f}_n$, composed of macroblocks from either the reference frame, the motion compensated reference frame, or both, is thus calculated by the switch rule at block 37. First, a mean square error is calculated between the pixels of the current frame macroblock and the reference frame macroblock in accord with eq. 12:

$$no\ mc\ SE = \sum_{i=1}^{16} \sum_{j=1}^{16} [x_n(i,j) - x_r(i,j)]^2 \quad (12)$$

where no mc SE is the square error for the reference frame without motion compensation or "prior error signal", $x_n(i,j)$ is the pixel value of the macroblock of the current frame, and $x_r(i,j)$ is the spatially co-located pixel value of the macroblock of the reference frame.

A mean square error is also calculated between the pixels of the current frame macroblock and the motion compensated reference frame macroblock in accord with eq. 13:

$$mc\ SE = \sum_{i=1}^{16} \sum_{j=1}^{16} [x_n(i,j) - x_{r'}(i,j)]^2 \quad (13)$$

where mcSE is the square error for the reference frame with motion compensation or "motion compensated prior error signal", $x_n(i,j)$ is the pixel value of the macroblock of the current frame, and $x_{r'}(i,j)$ is the corresponding pixel value in the motion compensated macroblock.

When the error signal for the reference frame (no mc SE) is greater than the error signal for the motion compensated reference frame (mc SE), the macroblock from the motion compensated reference frame is used as part of the best frame. When the error signal for the reference frame is less than the error signal for the motion-compensated reference frame, the macroblock from the reference frame is used as part of the best frame.

A frame difference e between the current frame $f_n$ and the best frame $\bar{f}_n$ is calculated at block 38. This frame difference e is used by the non-linear mapper 34 as described above, to calculate a weighting factor $\alpha$. The weighting factor $\alpha$ is multiplied by the frame difference e at block 69 and the product is then added to the best frame $\bar{f}_n$ at block 70 to create an intermediate frame $f'_n$.

A second frame difference e' between the intermediate frame and the adjacent future frame is calculated at block 71. The second frame difference is used, as described above, to obtain a second weighting factor $\alpha'$. The second weighting factor is multiplied by the second frame difference and the product is added to the future adjacent frame to obtain a filtered frame $\hat{f}_n$.

Figure 7:
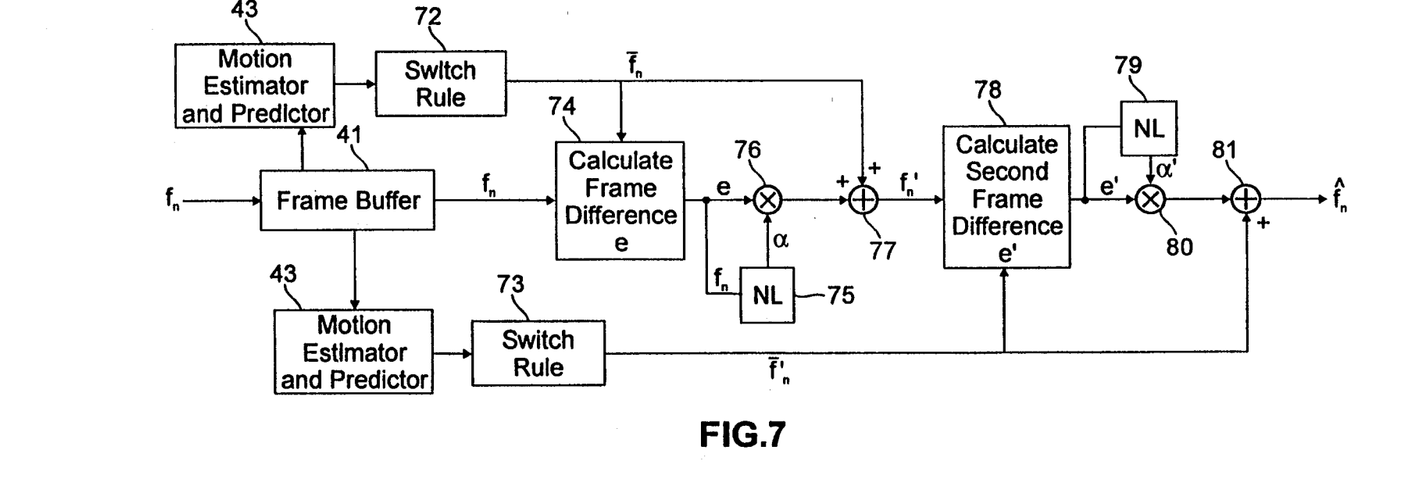
FIG. 7 is a block diagram of the method of filtering of the present invention for B-pictures.

FIG. 7 is a block diagram of a temporal filter for B-pictures. The frame buffer 41 (or frame buffer 61 if decoding) stores the signals for the current frame $f_n$, the prior reference frame which can be previously filtered 2 or p and the future reference frame. (which can be a future filtered 2 or p). The signals for the current frame and the prior reference frame are sent to motion estimator and predictor 43 (or decoder 6 if decoding) where the current frame is divided into macroblocks and motion vectors and predictions are generated.

As discussed above, the switch rule is applied at block 72 to create a prior best frame $\bar{f}_n$ composed of the macroblocks from either the prior reference frame or the motion compensated reference frame, whichever are nearer the current frame. The frame difference between the current frame and the prior best frame is calculated at block 74. The frame difference is used by the non-linear filter 75 to obtain a weighting factor $\alpha$. The weighting factor is multiplied by the frame difference and the product is added to the prior best frame to obtain an intermediate frame $f_n$.

The signals for the current frame and the future reference frame are also sent to motion estimator and predictor 43 (or decoder 6 if decoding) where the current frame is divided into macroblocks and motion vectors and predictions are generated. The switch rule is applied at block 73 to create a future best frame $\bar{f'}_n$ composed of macroblocks from either the future reference frame or the motion compensated future reference frame, whichever are nearer the current frame.

The frame difference e' between the intermediate frame f'$_n$ and the future best frame is calculated at block 78. The frame difference e' is used by non-linear mapper 79 to determine a weighting factor $\alpha'$. The weighting factor is multiplied by the frame difference e' and the product is added to the future best frame to create the filtered frame $f_n$. Because the filtered frame is an averaged frame, random fluctuations (i.e., noise) in the current frame are reduced because they are averaged with a future and prior frame which do not have these fluctuations.

The program code used by the programmed computer processors 50 and 55 to perform to perform the filtering disclosed above is set forth in Appendix I. The above description of a preferred embodiment is in no way a limitation on the scope of the invention which is defined by the following claims.

I claim:

1. A video filtering system for reducing noise in a motion video sequence comprising:
   a source of frame signals;
   a computer processor for filtering frame signals in the video sequence;
   an input line for sending said frame signals from the source to the computer processor;
   an encoder having a frame buffer for storing frame signals corresponding to at least a current frame and a prior frame; and
   a frame buffer input line for sending said frame signals from the frame buffer to the computer processor;
   wherein the computer processor comprises:
   means, operably engaged to the frame buffer, for comparing the frame signals for the current frame with the prior frame to generate a first frame difference;
   means, operably engaged to the comparing means, for determining a weighting factor based, at least in part, on the first frame difference; and
   means, operably engaged to the determining means, for generating the filtered signal for an intermediate frame based, at least in part, on the weighting factor and the signal for the prior frame.

2. The system of claim 1 further comprising:
   means for comparing the intermediate frame signal with a future frame signal to generate a second fame difference;
   means for determining a second weighting factor based, at least in part, on the second frame difference; and
   means for generating a filtered frame signal based, at least in part, on the second weighting factor and the future frame signal.

3. The system of claim 2 wherein the prior frame is an adjacent prior frame to the current frame.

4. The system of claim 2 wherein the future frame is an adjacent future frame to the current frame.

5. The system of claim 2 wherein the encoder further comprises a motion estimator operably engaged to the frame buffer, which motion estimator can generate a motion compensated frame signal and wherein the computer processor further comprises:
   means for separating the current frame signal into current macroblocks;
   means for comparing the current macroblocks with macroblocks in the prior frame signal to generate a prior error signal;
   means for comparing the current macroblocks with macroblocks in a motion-compensated prior frame signal to generate a motion-compensated prior error signal; and
   means for combining the macroblocks with the smallest prior error signals into a prior best frame signal.

6. The system of claim 5 wherein computer processor further comprises:
   means for comparing the current macroblocks with macroblocks in the future frame signal to generate a future error signal;
   means for comparing the current macroblocks with macroblocks in a future motion-compensated frame signal to generate a motion-compensated future error signal; and
   means for combining the macroblocks with the smallest future error signals into a future best frame.

7. The system of claim 1 wherein the means for calculating a weighting factor further comprises:
   means for setting the weighting factor to a lower constant if the frame difference is below a lower threshold; and
   means for setting the weighting factor to an upper constant if the frame difference is above an upper threshold.

8. The system of claim 7 wherein the means for calculating a weighting factor comprises a means for increasing the weighting factor as the frame difference increases when the frame difference is between the lower threshold and the upper threshold.

9. A method of filtering noise-contaminated video signals comprising the steps of:
   storing the signals for a current frame, an adjacent prior frame and an adjacent future frame;
   calculating a first frame difference between the current frame and the adjacent prior frame;
   calculating a first weighting factor based, at least in part, on the frame difference;
   multiplying the first weighting factor by the first frame difference to create a first product;
   adding the first product to the adjacent prior frame to create an intermediate frame;
   calculating a second frame difference between the intermediate frame and the adjacent future frame;
   calculating a second weighting factor based, at least in part, on the second frame difference;
   multiplying the second weighting factor by the second frame difference to create a second product; and
   adding the second product to the adjacent future frame to create a filtered frame.

10. The method of claim 9 wherein the step of calculating a first frame difference comprises the step of subtracting pixel values of the adjacent prior frame from the corresponding pixel values of the current frame.

11. The method of claim 9 wherein the step of calculating a second frame difference comprises the step of subtracting pixel values of the adjacent future frame from the corresponding pixel values of the intermediate frame.

12. The method of claim 9 wherein the first weighting factor is calculated such that the prior adjacent frame is given less weight as the frame difference increases.

13. The method of claim 12 wherein the prior adjacent frame is given no weight when the frame difference is above an upper threshold.

14. The method of claim 12 wherein the prior adjacent frame and the current frame are given equal weight when the frame difference is below a lower threshold.

15. A method of filtering noise-contaminated video signals for intercoded pictures based on the signals for a current frame, a prior reference frame and an adjacent future frame, comprising the steps of:
   calculating a motion compensated prior reference frame;
   comparing the current frame to the prior reference frame to create an error signal;
   comparing the current frame to the motion compensated prior reference frame to create a motion compensated error signal;
   selecting either the prior reference frame or the motion compensated reference frame which has the smaller error signal as a best frame;
   calculating a first frame difference between the current frame and the best frame;
   calculating a first weighting factor based, at least in part, on the first frame difference;
   calculating a first weighted average of the best frame and the current frame based, at least in part, on the first weighting factor wherein the weighted average is an intermediate frame;
   calculating a second frame difference between the intermediate frame and the adjacent future frame;
   calculating a second weighting factor based, at least in part, on the second frame difference; and
   calculating a second weighted average of the intermediate frame and the adjacent future frame based, at least in part, on the second weighting factor, wherein the second weighted average is a filtered frame.

16. The method of claim 15 wherein the step of selecting the best frame comprises the steps of:
   separating the current frame into current macroblocks;
   comparing the current macroblocks with spatially co-located macroblocks in the prior reference frame and the motion compensated reference frame; and
   combining the selected macroblocks into the best frame.

17. The method of claim 16 wherein the step of comparing the current macroblocks comprises the step of summing the squares of the differences of corresponding pixel values of the macroblocks being compared.

18. A method of filtering noise-contaminated video signals for intercoded pictures based on the signals for a current frame, a prior reference frame and a future reference frame, comprising the steps of:
   calculating a motion compensated prior reference frame;
   comparing the current frame to the prior reference frame to create a prior error signal;
   comparing the current frame to the motion compensated prior reference frame to create a motion compensated prior error signal;
   selecting the prior reference frame or the motion compensated reference frame which has the smaller prior error signal as a prior best frame;
   calculating a first frame difference between the current frame and the prior best frame;
   calculating a first weighting factor based, at least in part, on the first frame difference;
   calculating a first weighted average of the prior best frame and the current frame based, at least in part, on the first weighting factor wherein the weighted average is an intermediate frame;
   calculating a motion compensated future reference frame;
   comparing the current frame to the future reference frame to create a future error signal;
   comparing the current frame to the motion compensated future reference frame to create a motion compensated future error signal;
   selecting the future reference frame or the motion compensated reference frame which has the smaller future error signal as a future best frame;
   calculating a second frame difference between the future best frame and the intermediate frame;
   calculating a second weighting factor based, at least in part, on the second frame difference; and
   calculating a second weighted average of the intermediate frame and the future best frame based, at least in part, on the second weighting factor, wherein the second weighted average is a filtered frame.

19. The method of claim 18 wherein the step of selecting the prior best frame comprises the steps of:
   separating the current frame into current macroblocks;
   comparing the current macroblocks with spatially co-located macroblocks in the reference frame and the motion compensated reference frame;
   selecting the macroblock closest to the current macroblocks; and combining the selected macroblocks into the prior best frame.

20. The method of claim 19 wherein the step of comparing the current macroblocks comprises the step of summing the squares of the differences of corresponding pixel values of the macroblocks being compared.

21. The method of claim 18 wherein the step of selecting the future frame comprises the steps of:
    separating the current frame into current macroblocks;
    comparing the current macroblocks with spatially co-located macroblocks in the future reference frame and the motion compensated future reference frame;
    selecting the macroblock closest to the current macroblocks; and
    combining the selected macroblocks into the prior best frame.

22. The method of claim 21 wherein the step of comparing the current macroblocks comprises summing the squares of the differences of corresponding pixel values of the macroblocks being compared.

23. A system for filtering noise contaminated signals for motion video comprising:
    a means for storing signals for a current frame, a prior frame and a future frame; and
    a computer processor operably engaged to said signal storing means having: means for calculating a first frame difference between the current frame and the prior frame;
    means for calculating an intermediate frame signal as a weighted average of the current frame signal and the prior frame signal such that the prior frame is given less weight as the frame difference increases;
    means for calculating a second frame difference between the intermediate frame signal and the future frame signal; and
    means for calculating a filtered frame as a weighted average of the intermediate frame signal and the future frame signal such that the future frame is given less weight as the second frame difference increases.

24. The system of claim 23 wherein the means for calculating an intermediate frame signal comprises:
    a means for calculating a weighting factor based on the frame difference;
    means for multiplying the weighting factor and the frame difference to obtain a product; and
    means for adding the product to the prior frame.

25. The system of claim 23 wherein the means for calculating a filtered frame comprises:
    means for calculating a weighting factor based on the second frame difference;
    means for multiplying the weighting factor and the second frame difference to obtain a product; and
    means for adding the product to the future frame.

26. The system of claim 23 wherein the prior frame is a prior adjacent frame.

27. The system of claim 23 wherein the future frame is a future adjacent frame.

28. A video filtering system for reducing noise in frame signals in a bitstream comprising:
    a computer processor for filtering the frame signals;
    a decoder having a frame buffer and a motion estimator;
    an input line for sending the frame signals from the decoder to the computer processor;
    an output line for sending filtered signals from the computer processor to a display;
    a frame buffer input line for sending signals from the frame buffer to the computer processor;
    means for comparing a current frame with a prior frame to generate a first frame difference; and
    means for calculating a weighting factor based, at least in part, on the first frame difference; and
    means for calculating a weighted average of the prior frame and the current frame based, at least in part, on the weighting factor.

29. The system of claim 28 wherein the weighted average is an intermediate frame and further comprising:
    means for comparing the intermediate frame with a future frame to generate a second frame difference; and
    means for calculating a second weighted average of the intermediate frame and the future frame based, at least in part, on the second weighting factor.

* * * * *